United States Patent
Manja Ppallan et al.

(10) Patent No.: US 12,335,769 B2
(45) Date of Patent: Jun. 17, 2025

(54) METHOD AND SYSTEM FOR CHANNEL QUALITY ASSISTED TRANSPORT IN WIRELESS NETWORK

(71) Applicant: SAMSUNG ELECTRONICS CO., LTD., Suwon-si (KR)

(72) Inventors: Jamsheed Manja Ppallan, Bangalore (IN); Karthikeyan Arunachalam, Bangalore (IN); Shiva Souhith Gantha, Bangalore (IN); Aneesh Deshmukh, Bangalore (IN); Seongkyu Song, Suwon-si (KR); Sweta Jaiswal, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 17/742,930

(22) Filed: May 12, 2022

(65) Prior Publication Data
US 2022/0369151 A1 Nov. 17, 2022

Related U.S. Application Data

(63) Continuation of application No. PCT/KR2022/006416, filed on May 4, 2022.

(30) Foreign Application Priority Data

May 13, 2021 (IN) .............................. 202141021585
Apr. 22, 2022 (IN) .............................. 202141021585

(51) Int. Cl.
H04W 4/00 (2018.01)
H04W 24/08 (2009.01)
(Continued)

(52) U.S. Cl.
CPC ....... *H04W 28/0236* (2013.01); *H04W 24/08* (2013.01); *H04W 80/06* (2013.01)

(58) Field of Classification Search
None
See application file for complete search history.

(56) References Cited

U.S. PATENT DOCUMENTS

2012/0075994 A1 3/2012 Haggar et al.
2012/0147750 A1 6/2012 Pelletier et al.
(Continued)

FOREIGN PATENT DOCUMENTS

| EP | 1914952 A1 * | 4/2008 | .......... H04W 52/286 |
|---|---|---|---|
| KR | 10-2014-0077936 | 6/2014 | |
| WO | 1997/22201 | 6/1997 | |

OTHER PUBLICATIONS

Andreadis et al., "A cross-layer jitter-based TCP for wireless networks"—https://jwen-eurasipjournals.springeropen.com/articles/10.1186/s13638-016-0695-0 , 2016, 11 pages.
(Continued)

*Primary Examiner* — Zewdu A Beyen
(74) *Attorney, Agent, or Firm* — NIXON & VANDERHYE P.C.

(57) ABSTRACT

The disclosure provides a method of Channel Quality Assisted (CQA) transport by a Transmission Control Protocol (TCP) receiver in a wireless network. The method includes: monitoring quality of a wireless channel based on at least one of signal quality parameters and wireless channel events; detecting a fluctuation in the quality of the wireless channel; and sending an indication of the fluctuation in the quality of the wireless channel to a TCP transmitter configured to adjust at least one parameter of a transport layer based on the fluctuation in the quality of the wireless channel.

17 Claims, 13 Drawing Sheets

(51) Int. Cl.
*H04W 28/02* (2009.01)
*H04W 80/06* (2009.01)

(56) References Cited

U.S. PATENT DOCUMENTS

| | | | |
|---|---|---|---|
| 2013/0077501 | A1 | 3/2013 | Krishnaswamy et al. |
| 2013/0176854 | A1 | 7/2013 | Chisu et al. |
| 2018/0139629 | A1* | 5/2018 | Chakrabarti ........ H04L 41/0896 |
| 2018/0242191 | A1 | 8/2018 | Undqvist et al. |
| 2018/0302333 | A1 | 10/2018 | Zhang et al. |
| 2019/0044874 | A1 | 2/2019 | Zhang et al. |
| 2019/0166052 | A1 | 5/2019 | Hadorn et al. |

OTHER PUBLICATIONS

Luo et al., "TCP-Aware Cross-Layer Design in Cognitive Radio Networks", IEEE, 2009, 5 pages.
Priya et al., "Cross Layer Approach to Enhance TCP Performance over Wireless Networks", Proceedings of the 2010 IEEE Students' Technology Symposium, https://iecexplore.ieee.document/5469175, Apr. 3-4, 2010, 6 pages.
Thaseen et al., "Analysis of Cross Layer Schemes to Enhance TCP Performance in Manet", ICTACT Journal on Communication Technology, Sep. 2012, vol. 03, Issue: 03, http://ietactjournals.in/paper/IJCT_Vol3_Iss3_Sep(2012)_P4_587_593.pdf, Sep. 2012, 7 pages.
Srivastava et al., "Cross-Layer Design: A Survey and the Road Ahead", IEEE Communications Magazine • Dec. 2005, https://ieeexplore.ieee.org/document/1561928, Dec. 2005, 8 pages.
Wang et al., "Cross-Layer Optimization in TCP/IP Networks", IEEE/ACM Transactions on Networking, vol. 13, No. 3, https://authors.library.caltech.edu/7702/1/WANieeeacmm05.pdf, Jun. 2005, 14 pages.
Azzino et al., "XTCP: A Cross Layer Approach for TCP Uplink Flows in mmWave Networks", 16th Annual Mediterranean Ad Hoc Networking Workshop, 2017 IEEE, https://ieeexplore.ieee.org/document/8001650, 6 pages.
Lee et al., "Cross-layer Design for TCP Splitting Connections with Network Coding in DVB-RCS Networks", 2014 IEEE, https://ieeexplore.ieee.org/document/6983347, 4 pages.
Wang et al., "Cross-Layer Design for TCP Performance Improvement in Vehicular Communication Networks", ICACT2012, https://ieeexplore.ieee.org/document/6174694, Feb. 19-22, 2012, 6 pages.
Zhang et al., "Transport Layer Performance in 5G mmWave Cellular", 2016, IEEE https://ieeexplore.ieee.org/stamp/stamp.jsp?tp=&arnumber=7562173, 6 pages.
Mateo et al., "Analysis of TCP Performance in 5G mm-wave Mobile Networks", 2019 IEEE, https://ieeexplore.ieee.org/stamp/stamp.jsp?tp=&arnumber=8761718, 7 pages.
Zhang et al., "Will TCP work in mmWave 5G Cellular Networks?", IEEE Communication Magazine, https://arxiv.org/pdf/1806.05783.pdf, Oct. 2018, 7 pages.
Zhang et al., "The Bufferbloat Problem over Intermittent Multi-Gbps mmWave Links", https://arxiv.org/pdf/1611.02117.pdf, Nov. 2016, 6 pages.
Polese et al., "TCP and MP-TCP in 5G mmWave Networks", 2017 IEEE, https://ieeexplore.ieee.org/stamp/stamp.jsp?tp=&arnumber=8039300, 8 pages.
Polese et al., "TCP in 5G mmWave Networks: Link Level Retransmissions and MP-TCP", 2017 IEEE Infocom, 5G & Beyond Workshop, May 1, 2017, https://arxiv.org/pdf/1703.08985.pdf, 6 pages.
"Impact of blockage on TCP performance in high frequency scenarios", MediaTek Inc., Apr. 2017, https://portal.3gpp.org/ngppapp/CreateTDoc.aspx?mode=view&contributionUid=R2-1703524, R2-1703524, Revision of R2-170686, 5 pages.
Indian Office Action issued Jan. 5, 2023 in corresponding Indian Patent Application No. 202141021585.
Search Report and Written Opinion issued Aug. 10, 2022 in counterpart International Patent Application No. PCT/KR2022/006416.

* cited by examiner

METHOD AND SYSTEM FOR CHANNEL QUALITY ASSISTED TRANSPORT IN WIRELESS NETWORK

CROSS-REFERENCE TO RELATED APPLICATIONS

This application is a continuation of International Application No. PCT/KR2022/006416 designating the United States, filed on May 4, 2022, in the Korean Intellectual Property Receiving Office and claiming priority to Indian Provisional Patent Application No. 202141021585, filed on May 13, 2021, in the Indian Patent Office, and to Indian Complete Patent Application No. 202141021585, filed on Apr. 22, 2022, in the Indian Patent Office, the disclosures of all of which are incorporated by reference herein in their entireties.

BACKGROUND

Field

The disclosure relates to a wireless network, and for example, to a method and a system for channel quality assisted transport in the wireless network.

Description of Related Art

High-speed cellular networks such as Fifth Generation (5G) cellular network aspire to attain peak performance of tens of Gigabits-per-second (Gbps) in both Download (DL) and Upload (UL) with high frequency beamforming as an enabling technology. A transmitted signal at high frequencies (e.g. mmWave, TeraHertz) is prone to blockage caused by buildings, vehicles, human movement, etc. A sudden large loss in strength of the transmitted signal created by such an obstruction can result in a drop in UE throughput, e.g., lack of channel quality awareness causes a throughput degradation during channel quality fluctuations. So, it is important for a transport layer of the 5G cellular networks to consider radio layer information for channels like mmWave.

The transport layer decides data sending rate, flow, and congestion controls based on network capacity, latency, bottleneck link, windowing/buffer size, packet losses which are unable to adapt with highly unpredictable channels like mmWave and TeraHertz that results in frequent handovers, blockages, and channel quality fluctuations. Even though Transmission Control Protocol (TCP) variants are evolved to identify wired and wireless losses, none of the variants are capable to cope with variations in wireless channel quality, which affects a user experience.

A typically base station utilizes Channel Quality Indicator (CQI) transmitted by a User Equipment (UE) for scheduling resources and deciding Available Data Rate (ADR) of a wireless channel for the UE. The base station assigns several Resource Blocks (RBs) to the UE for each new Transmission Time Interval (TTI) based on the CQI and network load. Hence, end-users within a cell corresponding to the base station may experience abrupt variation in the ADR as the channel quality between them and the base station varies. Moreover, existing congestion and flow controlling methods are failed to find an optimal condition for a smooth operation of data communication during blockages.

FIG. 1A is a diagram illustrating how a typical cellular network operates between a UE and a server for the data communication. The UE is a TCP receiver (10), and the server is a TCP sender/transmitter (20). The cellular network includes a Radio Access Network (RAN) (30), a core network (40), and internet (50), where the TCP receiver (10) is connected to the RAN (30) and the TCP sender (20) is connected to the internet (50). The TCP sender (20) controls data sending rate using congestion control TCP, and Quick UDP Internet Connections (QUIC) like protocols use packet loss as congestion indication, whereas the TCP sender (20) lacks awareness of radio condition. FIG. 1B is a diagram illustrating a bottleneck link (50a, 50b) in the cellular network. The cellular network includes multiple RANs (30a, 30b), where the TCP receivers (10a, 10b) are connected to the multiple RANs (30a, 30b), and the TCP senders (20a) are connected to the multiple RANs (30a, 30b) via the bottleneck link (50a, 50b). Performance issues of the transport layer occur at the bottleneck link (50a, 50b) due to frequent radio channel fluctuations, misinterpretation of wireless losses as congestion, and delay caused by various RAN procedures. Further, the frequent rapid radio channel fluctuations cause for under utilizations of available bandwidth.

Thus, it is desired to evolve the transport layer for high-frequency bands to overcome the issues of frequent link variation and dynamic network capacity, and wireless losses.

SUMMARY

Embodiments of the disclosure provide a method and a system for channel quality assisted transport in a wireless network by enhancing congestion/flow control and delay optimization.

Embodiments of the disclosure evaluate real-time channel quality using information from radio protocol stack.

Embodiments of the disclosure indicate channel quality indication to a TCP sender/transmitter for optimally controlling congestion and flow control mechanism at the transport layer during the frequent rapid radio channel fluctuations.

Embodiments of the disclosure improve an end-to-end performance over wireless channels by allowing a transport layer to identify a current state of a link-layer and adapt the link-layer during dynamic wireless channel conditions.

Embodiments of the disclosure improve the bandwidth utilization at the transport layer by explicit cross-layer information exchange.

Accordingly, example embodiments herein provide a method of Channel Quality Assisted (CQA) transport by a Transmission Control Protocol (TCP) receiver in a wireless network. The method includes: monitoring quality of a wireless channel based on signal quality parameters and/or wireless channel events; detecting a fluctuation in the quality of the wireless channel; and sending an indication of the fluctuation in the quality of the wireless channel to a TCP transmitter for adjusting at least one parameter of a transport layer based on the fluctuation in the quality of the wireless channel.

In an example embodiment, the at least one parameter of the transport layer includes a data flow control, a congestion control, and a Roundtrip Time (RTT) estimation.

In an example embodiment, the signal quality parameters include a Signal to Interference and Noise Ratio (SINR), Channel Quality Indicator (CQI), Received Signal Strength Indicator (RSSI), Reference Signal Received Power (RSRP), Reference Signal Received Quality (RSRQ), Received Signal Code Power (RSCP), and Energy per Chip to Interference power ratio EC/IO, and the wireless channel events comprising Radio Link Control/Packet Data Convergence Protocol (RLC/PDCP) statistics, packet re-ordering and link re-establishment, a ratio of packet loss and a frequency of t-reordering timer expiry.

In an example embodiment, the indication includes an Explicit Channel Quality Notification (ECQN) sent over the transport layer, where 2 bits of the ECQN are used for communicating four states comprising probing, first warning, second warning, and recovery of the channel quality between the TCP receiver and the TCP transmitter, and 2 bits of the ECQN are used for exchanging channel quality information among middle nodes of the TCP receiver and the TCP transmitter.

In an example embodiment, detecting, by the TCP receiver, the fluctuation in the quality of the wireless channel, comprises: determining, by the TCP receiver, whether the signal quality parameters meet an adaptive threshold value, wherein the signal quality parameters are determined using a windowed average and detecting, by the TCP receiver, the fluctuation in the quality of the wireless channel in response to determining that the signal quality parameters meet the adaptive threshold value.

In an example embodiment, detecting, by the TCP receiver, the fluctuation in the quality of the wireless channel in response to determining that the signal quality parameters meet the adaptive threshold value, comprises: detecting, by the TCP receiver, a packet loss at a Radio Link Control (RLC) in response to determining that the signal quality parameters meet the adaptive threshold value, initiating, by the TCP receiver, a t_reordering timer, monitoring, by the TCP receiver, for RLC reordering before expiry of the t_reordering timer, and detecting, by the TCP receiver, the fluctuation in the quality of the wireless channel in response to not detecting the RLC reordering before the expiry of the t_reordering timer.

In an example embodiment, sending, by the TCP receiver, the indication of the fluctuation in the quality of the wireless channel to the TCP transmitter, comprises: estimating, by the TCP receiver, an Available Data Rate (ADR) of the wireless channel based on one of a Transport Block (TB) size, and previous ADRs of the wireless channel, and sending, by the TCP receiver, the indication comprising the ADR and/or the quality of the wireless channel to the TCP transmitter.

In an example embodiment, estimating, by the TCP receiver, the ADR of the wireless channel based on the TB size, comprises: determining, by the TCP receiver, the TB size based on a CQI, a Downlink Control Information (DCI), and a network load, and estimating, by the TCP receiver, the ADR based on the TB size and the network load.

In an example embodiment, estimating, by the TCP receiver, the ADR of the wireless channel based on the previous ADRs of the wireless channel, comprises: determining, by the TCP receiver, the previous ADRs of the wireless channel, and predicting, by the TCP receiver, the ADR by applying the previous ADRs of the wireless channel to a linear predictive model.

In an example embodiment, sending, by the TCP receiver, the indication of the fluctuation in the quality of the wireless channel to the TCP transmitter for adjusting the at least one parameter of the transport layer based on the fluctuation in the quality of the wireless channel, comprises: determining, by the TCP receiver, whether an ADR of the wireless channel is estimated at the TCP receiver, performing, by the TCP receiver, one of: determining a data sending rate of the TCP transmitter based on the ADR in response to determining that the ADR of the wireless channel is estimated at the TCP receiver, sending the indication comprising the data sending rate to the TCP transmitter, determining whether the quality of the wireless channel meets an upper channel quality threshold and a lower channel quality threshold in response to determining that the ADR of the wireless channel is not estimated at the TCP receiver, performing one of: sending the indication comprising a zero-window advertisement to the TCP transmitter, in response to determining the quality of the wireless channel meets the upper channel quality threshold or the lower channel quality threshold, sending three duplicate acknowledgments to the TCP transmitter for resuming connection with the TCP receiver, in response to determining the quality of the wireless channel meets the upper channel quality threshold and does not meet the lower channel quality threshold, wherein the TCP receiver is allowed to send acknowledgments to the TCP transmitter.

Accordingly, example embodiments provide a method of CQA transport by the TCP transmitter in a wireless network. The method includes: receiving the indication of the fluctuation in the quality of the wireless channel from the TCP receiver; performing congestion control and/or the Roundtrip Time (RTT) estimation based on the fluctuation in the quality of the wireless channel.

In an example embodiment, the indication comprises an Available Data Rate (ADR) and/or quality of the wireless channel.

In an example embodiment, performing, by the TCP transmitter, the congestion control, comprises: storing, by the TCP transmitter, a current state of a Congestion Control Mechanism (CCM) upon receiving the indication comprising a first warning state or a second warning state, starting, by the TCP transmitter, a timer to track duration of the fluctuation, receiving, by the TCP transmitter, an indication comprising a recovery state from the TCP receiver, and restoring, by the TCP transmitter, a sending rate of the TCP transmitter to a pre-stored value or a current estimated ADR before starting next fluctuation, wherein based on the wireless channel not being recovered before expiry of the timer, then the stored values are ignored and, the TCP transmitter estimates an ADR.

In an example embodiment, performing, by the TCP transmitter, the RTT estimation, comprises: storing, by the TCP transmitter, a RTT measured during no fluctuation as a stable RTT, storing, by the TCP transmitter, the RTT measured during fluctuation as a first fluctuating RTT, upon receiving the indication comprising a first warning state or a second warning state, receiving, by the TCP transmitter, an indication comprising a recovery state from the TCP receiver, and modifying, by the TCP transmitter, a current RTT as the stable RTT.

In an example embodiment, the method comprises: determining, by the TCP transmitter, a TCP-Retransmission Timeout (TCP-RTO) using a deviated RTT and the first fluctuating RTT to reduce retransmissions during the fluctuation, storing, by the TCP transmitter, the TCP-RTO as a second fluctuating RTT, receiving, by the TCP transmitter, an indication comprising the recovery state from the TCP receiver, and determining, by the TCP transmitter, a normal TCP-RTO using a latest deviated RTT and a latest smoothed RTT.

Accordingly, various example embodiments provide a TCP receiver for CQA transport in the wireless network. The TCP receiver includes: a memory, and at least one a processor coupled to the memory. The at least one processor is configured to: monitor quality of a wireless channel based on signal quality parameters and/or wireless channel events; detect a fluctuation in the quality of the wireless channel; and send an indication of the fluctuation in the quality of the wireless channel to a TCP transmitter for adjusting at least one parameter of the transport layer based on the fluctuation in the quality of the wireless channel.

Accordingly, example embodiments provide the TCP transmitter for CQA transport in the wireless network. The TCP transmitter includes: a memory, and at least one processor coupled to the memory. The at least one processor is configured to: receive the indication of the fluctuation in the quality of the wireless channel from the TCP receiver; and perform the congestion control or the RTT estimation based on the fluctuation in the quality of the wireless channel.

These and other aspects of the various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

The disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1A:
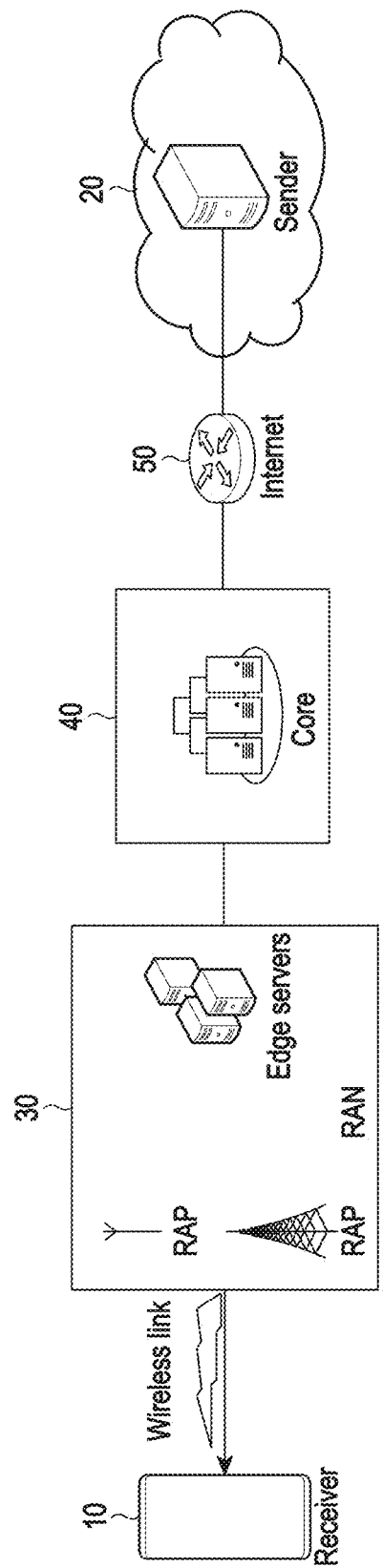
FIG. 1A is a diagram illustrating a typical cellular network operates between a UE and a server for data communication, according to prior art.
Figure 1B:
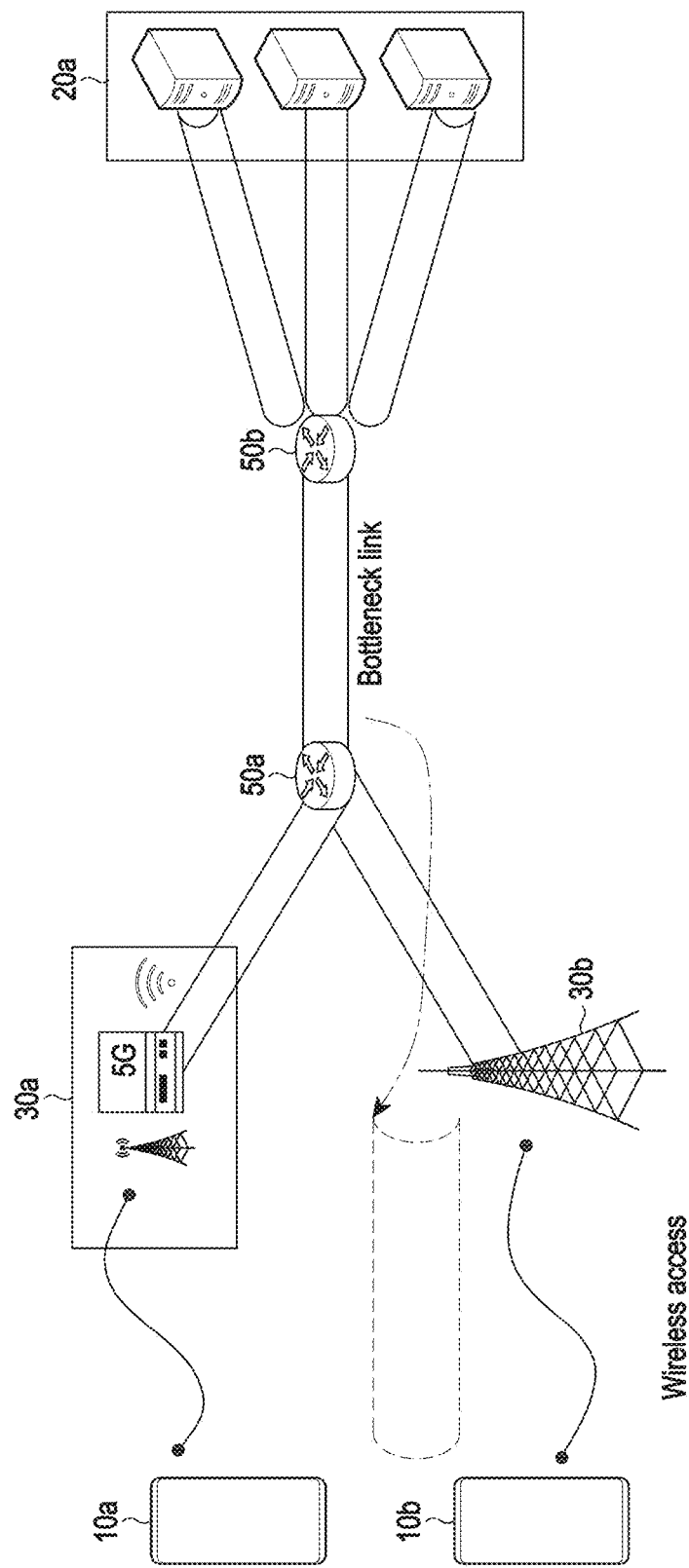
FIG. 1B is a diagram illustrating a bottleneck link in the cellular network, according to prior art.

The various example embodiments herein and the various features and advantageous details thereof are explained more fully with reference to the non-limiting example embodiments illustrated in the accompanying drawings and detailed in the following description. Descriptions of well-known components and processing techniques may be omitted so as to not unnecessarily obscure the description of the embodiments herein. The various example embodiments described herein are not necessarily mutually exclusive, as some embodiments can be combined with one or more other embodiments to form new embodiments.

The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "TCP transmitter", "TCP sender" and "sender" are used interchangeably. Throughout this disclosure, the terms "TCP receiver" and "receiver" are used interchangeably.

Accordingly, the various example embodiments herein provide a method of Channel Quality Assisted (CQA) transport for a wireless network. The method includes: monitoring, by a Transmission Control Protocol (TCP) receiver, quality of a wireless channel based on signal quality parameters and/or wireless channel events; detecting, by the TCP receiver, a fluctuation in the quality of the wireless channel; and sending, by the TCP receiver, an indication of the fluctuation in the quality of the wireless channel to a TCP transmitter for adapting the transport layer based on the fluctuation in the quality of the wireless channel.

Accordingly, the various example embodiments herein provide a method of CQA transport for a wireless network. The method includes: receiving, by the TCP transmitter, the indication of the fluctuation in the quality of the wireless channel from the TCP receiver; and performing, by the TCP transmitter, a congestion control and/or a Roundtrip Time (RTT) estimation based on the fluctuation in the quality of the wireless channel for adapting the transport layer.

Accordingly, the various example embodiments herein provide the TCP receiver for CQA transport in the wireless network. The TCP receiver includes: a CQAT controller, a memory, a processor, wherein the CQAT controller is coupled to the memory and the processor. The CQAT controller is configured to: monitor quality of a wireless channel based on signal quality parameters and/or wireless channel events; detect a fluctuation in the quality of the wireless channel; and send an indication of the fluctuation in the quality of the wireless channel to a TCP transmitter for adapting the transport layer based on the fluctuation in the quality of the wireless channel.

Accordingly, the various example embodiments herein provide the TCP transmitter for CQA transport in the wireless network. The TCP transmitter includes: a CQAT controller, a memory, a processor, where the CQAT controller is coupled to the memory and the processor. The CQAT controller is configured to: receive the indication of the fluctuation in the quality of the wireless channel from the TCP receiver; and perform the congestion control or the RTT estimation based on the fluctuation in the quality of the wireless channel for adapting the transport layer.

Referring now to the drawings, and more particularly to FIGS. 2A through 11, there are illustrated and described, various example embodiments.

Figure 2A:
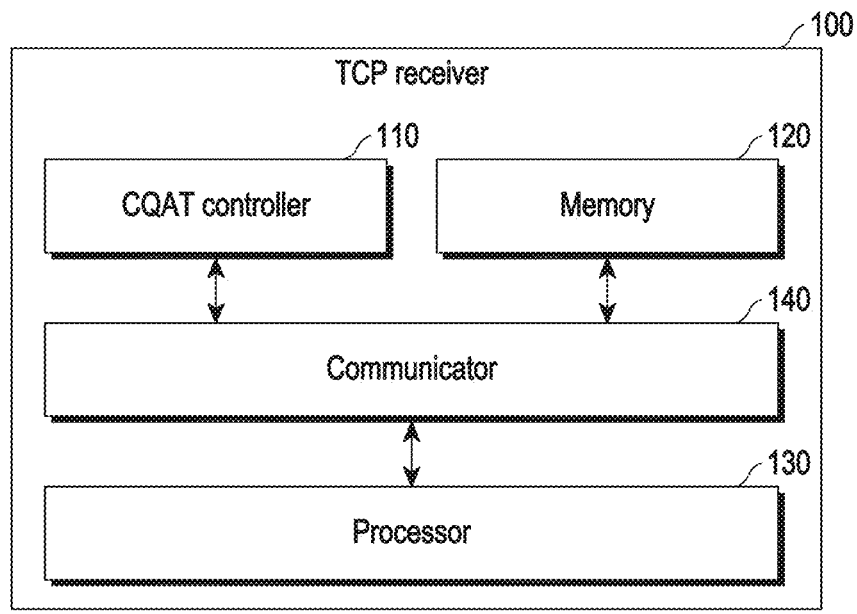
FIG. 2A is a block diagram illustrating an example configuration of a TCP receiver for CQA transport in a wireless network, according to various embodiments.

FIG. 2A is a block diagram illustrating an example configuration of a TCP receiver (100) for CQA transport in a wireless network, according to various embodiments. An example of the wireless network is a cellular network. Examples of the TCP receiver (100) include, but are not limited to a User Equipment (UE), a smartphone, a tablet computer, a Personal Digital Assistance (PDA), a desktop computer, an Internet of Things (IoT), a wearable device, etc. In an embodiment, the TCP receiver (100) includes a Channel Quality Assisted Transport (CQAT) controller (e.g., including various processing and/or control circuitry) (110), a memory (120), a processor (e.g., including processing circuitry) (130), and a communicator (e.g., including communication circuitry) (140). The CQAT controller (110) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. The CQAT controller (110) and the processor (130) may be referred to as at least one processor incorporatingly.

The TCP receiver (100) is connected to a TCP transmitter (200) via the wireless network for data communication. The CQAT controller (110) monitors quality of a wireless channel based on signal quality parameters and wireless channel events. The signal quality parameters include a Signal to Interference and Noise Ratio (SINR), a Channel Quality Indicator (CQI), a Received Signal Strength Indicator (RSSI), a Reference Signal Received Power (RSRP), a Reference Signal Received Quality (RSRQ), a Received Signal Code Power (RSCP), and an Energy per Chip to Interference power ratio (EC/IO). The wireless channel events include RLC/PDCP statistics, packet re-ordering, and link re-establishment, a ratio of packet loss, and a frequency of t-reordering timer expiry. Further, the CQAT controller (110) detects a fluctuation in the quality of the wireless channel.

In an embodiment, the CQAT controller (110) determines whether the signal quality parameters meet an adaptive threshold value, where the signal quality parameters are determined using a windowed average. Further, the CQAT controller (110) detects the fluctuation in the quality of the wireless channel in response to determining that the signal quality parameters meet the adaptive threshold value. In an embodiment, the CQAT controller (110) detects a packet loss at a Radio Link Control (RLC) in response to determining that the signal quality parameters meet the adaptive threshold value. Further, the CQAT controller (110) initiates a t_reordering timer. Further, the CQAT controller (110) monitors for RLC reordering before expiry of the t_reordering timer. Further, the CQAT controller (110) detects the fluctuation in the quality of the wireless channel in response to not detecting the RLC reordering before the expiry of the t_reordering timer.

The CQAT controller (110) sends an indication of the fluctuation in the quality of the wireless channel to a TCP transmitter (200) for adjusting one or more parameters of a transport layer based on the fluctuation in the quality of the wireless channel. The transport layer provides host-to-host communication services and transmits data using transmission protocols like TCP and UDP. In an embodiment, the one or more parameters of the transport layer includes a data flow control, a congestion control, and a Roundtrip Time (RTT) estimation.

In an embodiment, the indication is an Explicit Channel Quality Notification (ECQN) sent over the transport layer. Two bits of the ECQN are used for communicating four states including probing, first warning, second warning, and recovery of the channel quality between the TCP receiver (100) and the TCP transmitter (200), and remaining two bits of the ECQN are used for exchanging channel quality information among middle nodes of the TCP receiver (100) and the TCP transmitter (200).

In an embodiment, the CQAT controller (110) estimates an Available Data Rate (ADR) of the wireless channel based on a Transport Block (TB) size or a previous ADRs of the wireless channel. Further, the CQAT controller (110) sends the indication comprising the ADR and/or the quality of the wireless channel to the TCP transmitter (200). In an embodiment, the CQAT controller (110) determines the TB size based on a CQI and/or a Downlink Control Information (DCI) and/or a network load. Further, the CQAT controller (110) estimates the ADR based on the TB size and/or the network load. In an embodiment, the CQAT controller (110) determines the previous ADRs of the wireless channel. Further, the CQAT controller (110) predicts the ADR by applying the previous ADRs of the wireless channel to a linear predictive model.

In an embodiment, to control the packet plow (e.g., flow control) the CQAT controller (110) determines whether the ADR of the wireless channel is estimated at the TCP receiver (100). In an embodiment, the CQAT controller (110) determines a data sending rate of the TCP transmitter (200) based on the ADR in response to determining that the ADR of the wireless channel is estimated at the TCP receiver (100). Further, the CQAT controller (110) sends the indication including the data sending rate to the TCP transmitter (200). In an embodiment, the CQAT controller (110) determines whether the quality of the wireless channel meets an upper channel quality threshold and a lower channel quality threshold in response to determining that the ADR of the wireless channel is not estimated at the TCP receiver (100).

The CQAT controller (110) sends the indication including a zero-window advertisement to the TCP transmitter (200), in response to determining the quality of the wireless channel meets the upper channel quality threshold or the lower channel quality threshold. The zero-window advertisement indicates the TCP transmitter (200) that the TCP receive buffer of the TCP receiver (100) is full and the TCP receiver (100) cannot receive any more data. The CQAT controller (110) sends three duplicate acknowledgments to the TCP transmitter (200) for resuming connection with the TCP receiver (100), in response to determining the quality of the wireless channel meets the upper channel quality threshold and does not meet the lower channel quality threshold, where the TCP receiver (100) is allowed to send acknowledgments to the TCP transmitter (200). The flow Control will ensure that the TCP transmitter (200) is not overwhelming the TCP receiver (100) by sending packets faster than it can consume.

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the TCP receiver (100), a cloud storage, or any other type of external storage.

The processor (130) may include various processing circuitry and is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the TCP receiver (100). Further, the communicator (140) is configured to facilitate the communication between the TCP receiver (100) and other devices via one or more networks (e.g. Radio technology). The communicator (140) includes an electronic circuit specific to a standard that enables wired or wireless communication.

Although FIG. 2A shows the hardware components of the TCP receiver (100) but it is to be understood that other embodiments are not limited thereon. In other embodiments, the TCP receiver (100) may include less or a greater number of components. Further, the labels or names of the components are used only for illustrative purpose and does not limit the scope of the disclosure. One or more components can be combined together to perform same or substantially similar function for the CQA transport.

Figure 2B:
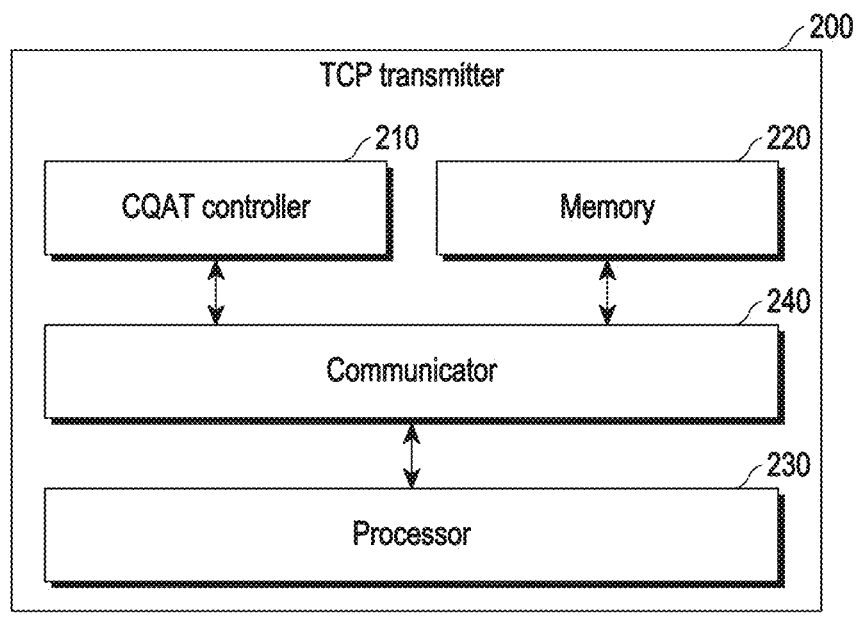
FIG. 2B is a block diagram illustrating an example configuration of a TCP transmitter for the CQA transport in the wireless network, according to various embodiments.

FIG. 2B is a block diagram illustrating an example configuration of the TCP transmitter (200) for the CQA transport in the wireless network, according to various embodiments. Examples of the TCP transmitter (200) include, but are not limited to a server (e.g. end-server, edge-server), etc. In an embodiment, the TCP transmitter (200) includes a CQAT controller (e.g., including various processing and/or control circuitry) (210), a memory (220), a processor (e.g., including processing circuitry) (230), a communicator (e.g., including communication circuitry) (240), and a main display, where the main display may include a physical hardware component that can be used to display to a user. Examples of the main display include, but are not limited to a light-emitting diode display, a liquid crystal display, a projector, etc. The CQAT controller (210) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. The CQAT controller (210) and the processor (230) may be referred to as at least one processor incorporatingly.

The TCP receiver (100) is connected to the TCP transmitter (200) via the wireless network for the data communication. The CQAT controller (210) receives the indication of the fluctuation in the quality of the wireless channel from the TCP receiver (100). The CQAT controller (210) performs the congestion control and/or the Roundtrip Time (RTT) estimation based on the fluctuation in the quality of the wireless channel for adapting the transport layer. The congestion control is about preventing/reducing a node from overwhelming the network.

In an embodiment, for performing the congestion control, the CQAT controller (210) stores a current state of a Congestion Control Mechanism (CCM) to the memory (220) upon receiving the indication comprising the first warning state or the second warning state. Further, the CQAT controller (210) starts a timer to track the duration of the fluctuation. Further, the CQAT controller (210) receives the indication including a recovery state from the TCP receiver (100). Further, the CQAT controller (210) restores a sending rate of the TCP transmitter (200) to a pre-stored value or a current estimated ADR before starting the next fluctuation. In an embodiment, when the wireless channel is not recovered before the expiry of the timer, then the stored values are ignored and, the CQAT controller (210) estimates an ADR.

In an embodiment, for performing the congestion control, the CQAT controller (210) stores a RTT measured during no fluctuation as a stable RTT to the memory (220).

Further, the CQAT controller (210) stores a RTT measured during fluctuation as a first fluctuating RTT to the memory (220), upon receiving the indication including the first warning state or the second warning state. Further, the CQAT controller (210) receives the indication including a recovery state from the TCP receiver (100). Further, the CQAT controller (210) modifies a current RTT as the stable RTT.

For adaptive restoration of the sending rate (e.g., storing and restoring sending rate during fluctuations), when the warning message is received about the CQ, the current state of the CCM is captured and the timer will be started. Once the CQ recovery message is received, the sending rate (cwnd) is restored to the pre-stored value before the blockage starts. The TCP's CCM skips additive increases and slow starts. It can improve under-utilization after the blockage recovers.

In an embodiment, the CQAT controller (210) determines a TCP-Retransmission Timeout (TCP-RTO) using a deviated RTT and the first fluctuating RTT to reduce retransmissions during the fluctuation. Further, the CQAT controller (210) stores the TCP-RTO as a second fluctuating RTT to the memory (220). Further, the CQAT controller (210) receives the indication including the recovery state from the TCP receiver (100). Further, the CQAT controller (210) determines a normal TCP-RTO using the latest deviated RTT and the latest smoothed RTT.

The memory (220) stores instructions to be executed by the processor (230). The memory (220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information than its storage space. In certain examples, a non-transitory storage medium may store data that can, over time, change (e.g., in Random Access Memory (RAM) or cache). The memory (220) can be an internal storage unit or it can be an external storage unit of the TCP transmitter (200), a cloud storage, or any other type of external storage.

The processor (230) may include various processing circuitry and is configured to execute instructions stored in the memory (220). The processor (230) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (230) may include multiple cores to execute the instructions. The communicator (240) is configured for communicating internally between hardware components in the TCP transmitter (200). Further, the communicator (240) is configured to facilitate the communication between the TCP transmitter (200) and other devices via one or more networks (e.g. Radio technology). The communicator (240) includes an electronic circuit specific to a standard that enables wired or wireless communication.

Although FIG. 2B shows the hardware components of the TCP transmitter (200) but it is to be understood that other embodiments are not limited thereon. In various embodiments, the TCP transmitter (200) may include less or a greater number of components. Further, the labels or names of the components are used only for illustrative purpose and does not limit the scope of the disclosure. One or more components can be combined together to perform same or substantially similar function for the CQA transport.

Figure 3:
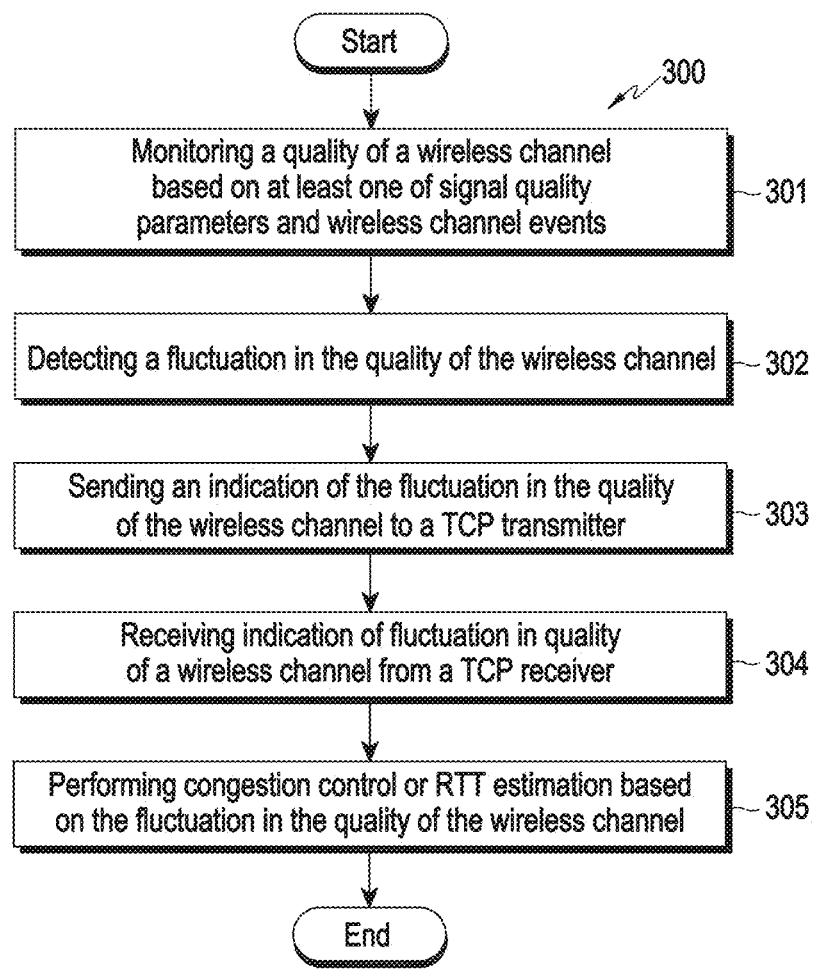
FIG. 3 is a flowchart illustrating an example method for the CQA transport in the wireless network, according to various embodiments.

FIG. 3 is a flowchart (300) illustrating an example method for the CQA transport in the wireless network, according to various embodiments. In an embodiment, the method allows the TCP receiver (100) to perform operations 301-303 of the flow diagram (300), and the TCP transmitter (200) to perform operations 304-305 of the flow diagram (300). At operation 301, the method includes monitoring the quality of the wireless channel based on the signal quality parameters and/or the wireless channel events. At operation 302, the method includes detecting the fluctuation in the quality of the wireless channel. At operation 303, the method includes sending the indication of the fluctuation in the quality of the wireless channel to the TCP transmitter (200). At operation 304, the method includes receiving the indication of the fluctuation in the quality of the wireless channel from the TCP receiver (100). At operation 305, the method includes performing the congestion control or the RTT estimation based on the fluctuation in the quality of the wireless channel for adapting the transport layer.

Figure 4:
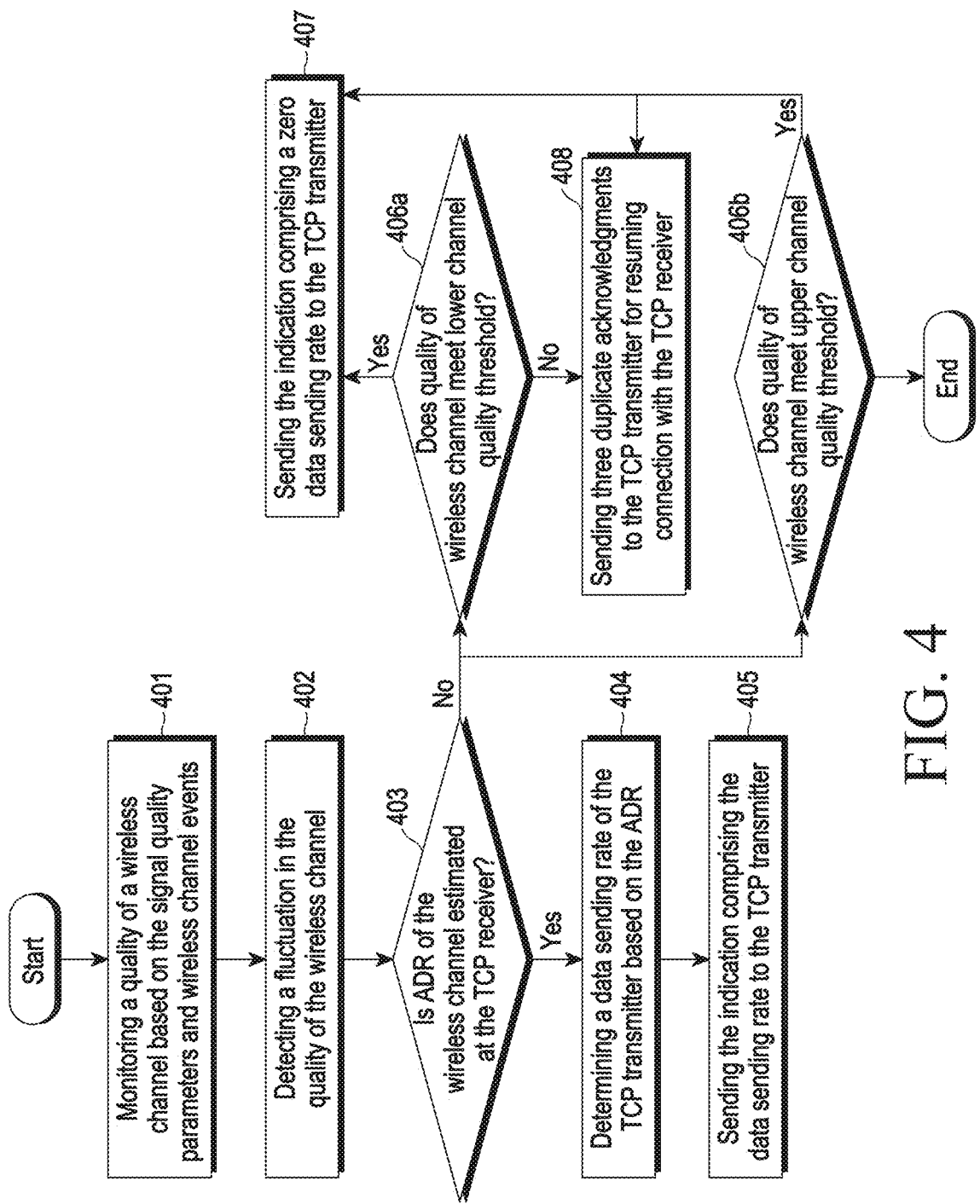
FIG. 4 is a flowchart illustrating an example method for the CQA transport in the wireless network, according to various embodiments.

FIG. 4 is a flowchart (400) illustrating an example method for the CQA transport in the wireless network, according to various embodiments. In an embodiment, the method allows the TCP receiver (100) to perform operations 401-408 of the flowchart (400). At operation 401, the method includes monitoring the quality of the wireless channel based on the signal quality parameters and the wireless channel events. At operation 402, the method includes detecting the fluctuation in the quality of the wireless channel. At operation 403, the method includes determining whether the ADR of the wireless channel is estimated at the TCP receiver (100). At operation 404, the method includes determining the data sending rate of the TCP transmitter (200) based on the ADR in response to determining that the ADR of the wireless channel is estimated at the TCP receiver (100) (403—Yes).

At operation 405, the method includes sending the indication including the data sending rate to the TCP transmitter (200). At operations 406 (e.g., 406a-406b), the method includes determining whether the quality of the wireless channel meets the upper channel quality threshold and the lower channel quality threshold in response to determining that ADR of the wireless channel is not estimated at the TCP receiver (100) (403—No). At operation 407, the method includes sending the indication including the zero-window advertisement to the TCP transmitter (200), in response to determining the quality of the wireless channel meets the upper channel quality threshold or the lower channel quality threshold. At operation 408, the method includes sending three duplicate acknowledgments to the TCP transmitter (200) for resuming connection with the TCP receiver (100), in response to determining the quality of the wireless channel meets the upper channel quality threshold in operation 406b and does not meet the lower channel quality threshold in operation 406a.

The various actions, acts, blocks, steps, or the like in the flow diagrams (400, 300) may be performed in the order presented, in a different order, or simultaneously. Further, in some embodiments, some of the actions, acts, blocks, steps, or the like may be omitted, added, modified, skipped, or the like without departing from the scope of the disclosure.

Figure 5:
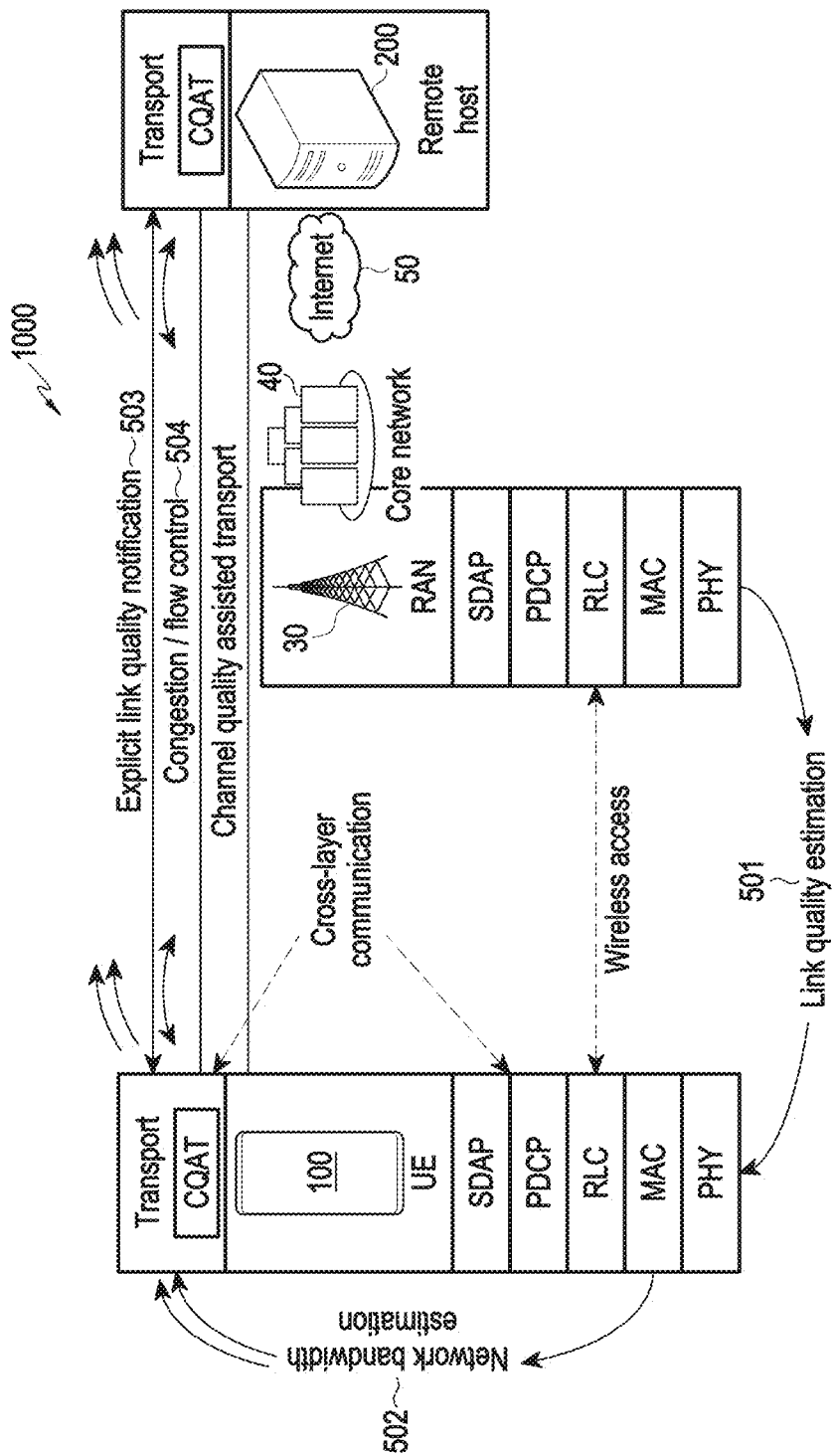
FIG. 5 is a diagram illustrating an example configuration of a system for the CQA transport in the wireless network, according to various embodiments.

FIG. 5 is a diagram illustrating an example configuration of a system (1000) for the CQA transport in the wireless network, according to various embodiments. The system (1000) includes the TCP receiver (100), the TCP transmitter (200), a RAN (30), a core network (40), and internet (50). The receiver connects to the TCP transmitter (200) via the RAN (30), the core network (40), and the internet (50). An example of the RAN (30) is a base station. At 501, the TCP receiver (100) evaluates real-time channel quality using information (e.g., signal quality parameters and/or the wireless channel events) from a radio protocol stack including Service Data Adaption Protocol (SDAP), Packet Data Convergence Protocol (PDCP), Radio Link Control (RLC), Medium Access Control (MAC), and Physical layer (PHY). The radio protocol stack is located between the base station and the UE. A user-plane protocol of the radio protocol stack includes PDCP, RLC, and MAC along with the PHY layer, where a control plan of the radio protocol stack has an RRC layer in addition.

At 502, the TCP receiver (100) estimates network bandwidth by determining the ADR of the wireless channel Upon detecting the fluctuation in the quality of the wireless channel by evaluating the real-time channel quality, the TCP receiver (100) performs cross-layer communication by communicating the ADR to the transport layer. Further, at 503, the TCP receiver (100) uses the transport layer to send the ECQN that includes an indication of the fluctuation in the quality of the wireless channel and the ADR to the TCP transmitter (200). At 504, upon receiving the ECQN from the TCP receiver (100), the TCP transmitter (200) performs the congestion control or the RTT estimation based on the ECQN for adapting the transport layer as per the current link quality. Moreover, the TCP receiver (100) performs the flow control for adapting the transport layer as per the current link quality.

The CQAT controller (110, 210) is an end-to-end solution to overcome transport protocol limitations in the wireless networks. The CQAT controller (110) includes a novel cross-layer mechanism with the radio protocol stack for estimating the link quality using signal quality parameters and radio-link event stats. Further, the CQAT controller (110) explicitly notifies the channel quality to a remote host (e.g., TCP transmitter (200)) and adapts the transport layer for high-frequency networks. The CQAT controller (110, 210) uses unique approaches for improving the throughput such as adaptive sending rate restoration, flow control for packet loss reduction, and dynamic RTT calculation techniques.

Figure 6:
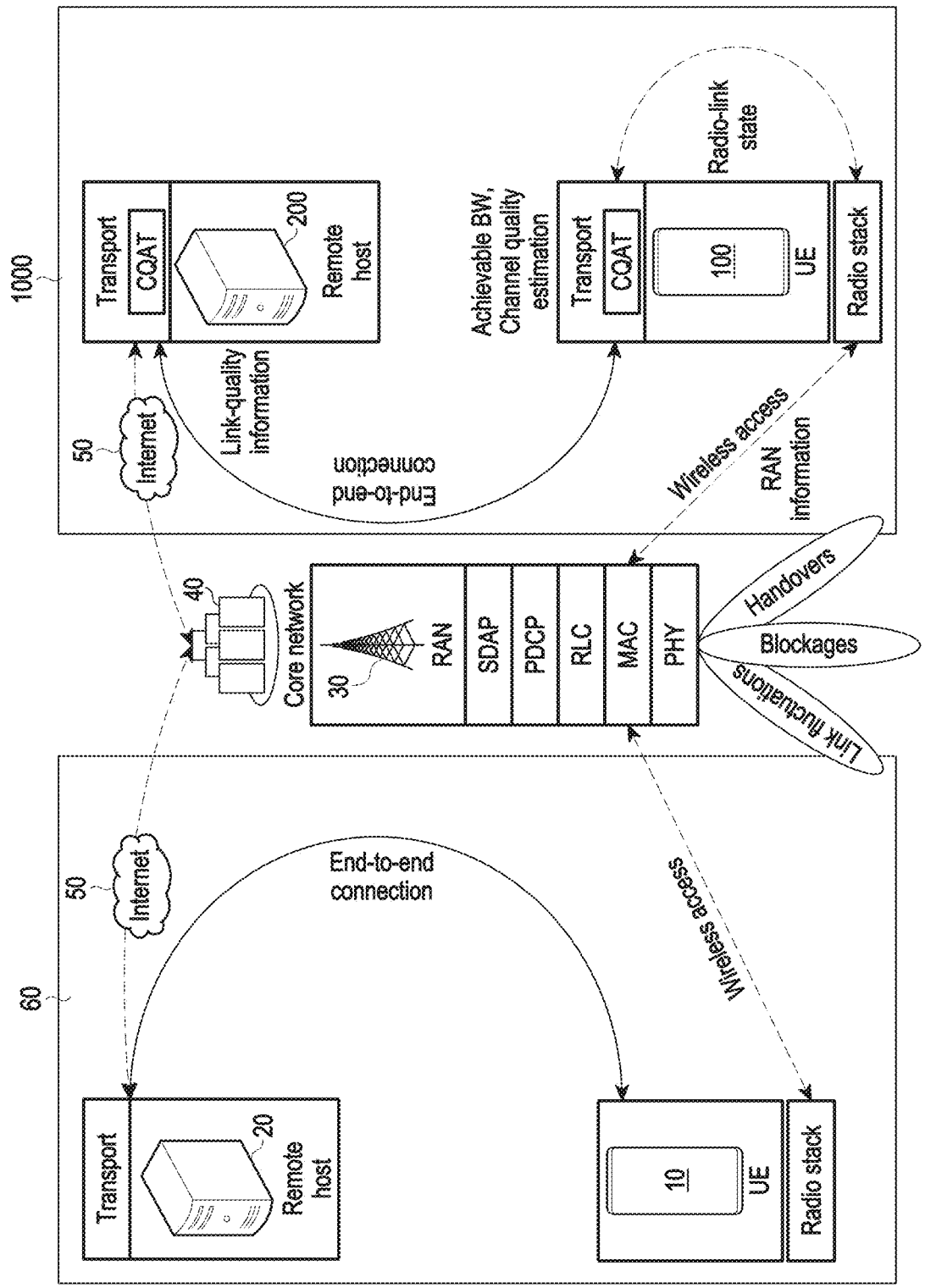
FIG. 6 is a diagram illustrating a comparison of RTT estimation, congestion control, and flow control in an existing system and the disclosed system during random wireless losses and link fluctuations, according to various embodiments.

FIG. 6 is a diagram illustrating a comparison of the RTT estimation, the congestion control, and flow control in an existing system (60) and the disclosed system (1000) during random wireless losses and link fluctuations, according to an embodiment as disclosed herein. In the existing system (60), An end-host (e.g., TCP receiver (10)) which is connected to a 5G wireless network (mmWave), starts a TCP connection with a remote host (e.g., TCP receiver (20)). The end-host is moving and, hence the signal quality varies. The bottleneck link is the wireless link and causes random wireless losses and link fluctuations. The wireless losses will be considered as congestion losses, that reduce the data sending rate and affects the throughput achieved. There is no information about the wireless link status in the end-host, which further causes for under-utilization of link capacity. Due to radio link events causes increased estimated RTT and increases delay.

Unlike the existing system (60), in the disclosed system (1000) the flow control depends only on the available window size and there is no information about the wireless link status. The system (1000) communicates explicit information about the radio link helps to adjust and restore the data sending rate with link fluctuations. Also, link capacity information assists the system (1000) to attain link capacity easily. The radio link information assists the system (1000) to improve the latency calculation with radio link events. The flow is adjusted by the system (1000) to avoid packet losses whenever the link quality fluctuated, The system (1000) reduces packet retransmissions and matches the receive window with the ADR information.

Figure 7A:
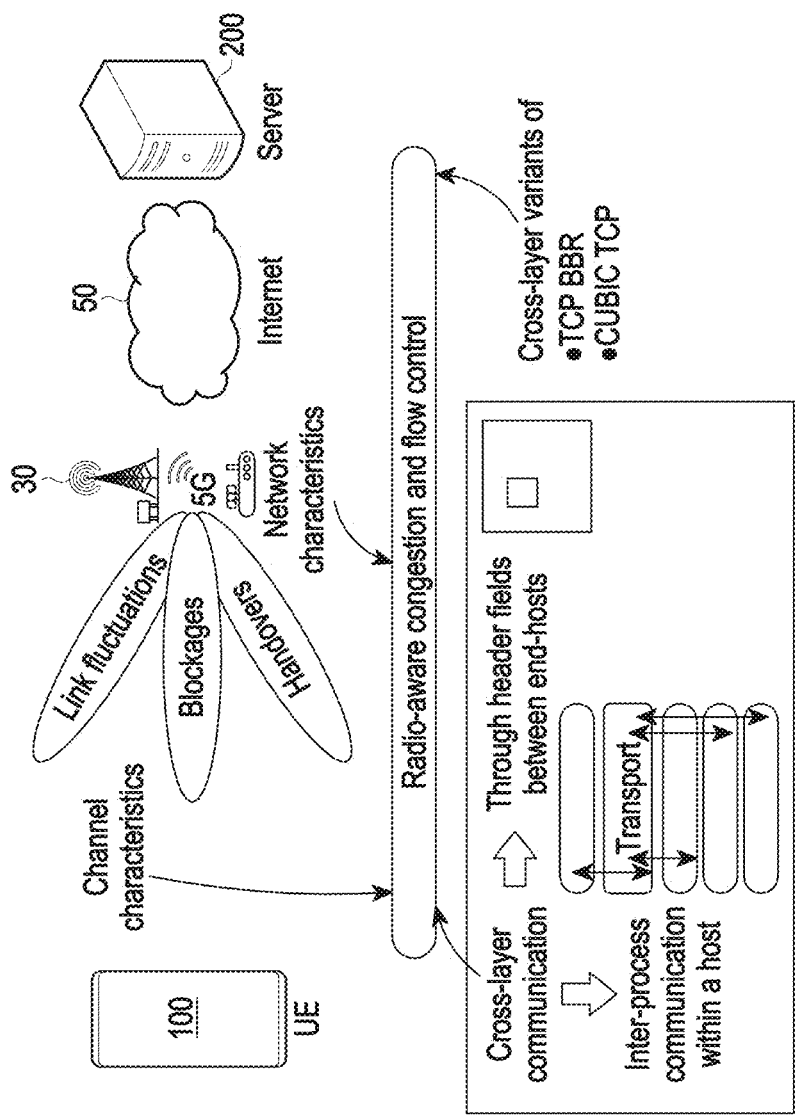
FIG. 7A is a diagram illustrating an example cross-layer communication for the CQA transport in the wireless network, according to various embodiments.

FIG. 7A is a diagram illustrating example cross-layer communication for the CQA transport in the wireless network, according to various embodiments. To evaluate link-layer/wireless channel conditions, the method includes the network capacity estimation and link quality estimation. The network capacity (e.g., ADR) estimation: Due to dynamic resource scheduling, end-users within same cell may experience abrupt variation in the ADR. Therefore, explicit knowledge about the ADR can significantly improve the utilization of network capacity. The CQAT controller (110) uses the linear predictive model over the TB size from a DCI message or the CQI value and the network load for ADR estimation. The link quality estimation: The propagation properties of high-frequency channels cause high propagation loss and fluctuations due to blockages. Hence, link quality must be estimated to avoid the impact of link fluctuation on transport layer. The CQAT controller (110) optimally shares the estimated ADR over the transport layer flows inside the receiver (100), according to their characteristics and quality requirements. Equation 1 is to evaluate link bandwidth capacity (ABW).

$$ABW = \Omega \cdot h(Q) \cdot rateDRB \quad (1)$$

where, $\Omega$ is system bandwidth extracted from System Information (SI), h(Q) is the adaptive threshold applied on the signal quality, Q is the real-time signal quality parameter, and rateDRB is calculated from the network load ($\sigma$) using DRB resources. ADR ($\omega$) can be determined using equation 2 by estimating the TB size ($TB_{size}$) from the CQI value.

$$\omega = \frac{TB_{size}}{T_{tti}} \quad (2)$$

where $TB_{size} = f(N_{PRB}, I_{MCS}) \times \sigma$, Ttti is transmission time interval in milli seconds. $\omega$ is calculated for every Ttti interval. The variation over the Ttti interval can be modelled as a linear function.

Alternatively, the ADR ($\omega$) can be determined using equation 3 by estimating the TB size ($TB_{size}$) from the DCI message.

$$\omega = \frac{TB_{size}}{T_{tti}} \times \sigma \quad (3)$$

Alternatively, the ADR ($\omega$) can be determined using equation 4 using the linear predictive model, where, $\omega$ (n) is the predicted ADR, $\omega$ (n−i) the previous observed values, with p≤n and ai is the prediction coefficient. The linear predictive model uses previous 'p' values of ADR including an estimated current ADR to predict the ADR, which is RTT time in the future.

$$\hat{\omega}(n) = \sum_{i=1}^{p} a_i \times \omega(n-i) \quad (4)$$

Since the signal Quality parameter (SINR, CQI) fluctuations are too dynamic and not suitable for determining the RTT impacts, the CQAT controller (110) monitors the RAN procedures and their parameters for detecting link quality fluctuation. The CQAT controller (110) uses performs unique adaptive thresholding over the signal quality parameters to detect the link fluctuations. Also, the CQAT controller (110) uses the radio protocol stack, the signal quality parameters, layer-2 information/events such as the ratio of packet loss and frequency of t-reordering timer expiry that has an immediate impact on the transport layer to detect the link fluctuations. Usually, RAN procedures adapt best to ensure that higher layers are agnostic to such dynamic variations of signal quality parameters. Hence, along with the SINR and CQI thresholding techniques, the CQAT controller (110) relies on layer-2 information/events for defining the link quality. In an example, when the SINR change is greater than a threshold, the CQAT controller (110) detects the link fluctuations. Radio Link Control Unacknowledged Mode (RLC UM): Ratio of missing RLC SN to the complete Radio Link Control Sequence Number (RLC SN) being delivered. Radio Link Control Acknowledged Mode (RLC AM): Ratio of retransmitted RLC SN to the complete RLC SN being delivered.

During downlink, if the wireless link is at the receiver (100), then the receiver (100) notifies the sender (200) about the radio link quality for the congestion control modification. During uplink, if the wireless link is at the sender (200), then the sender (200) notifies the receiver (100) about radio link quality for the flow control modification.

The transport layer adaptation includes the congestion control, the flow control, the RTT recalculation, and timer calculations together for a precise RTT and throughput estimate in both download and upload scenarios. The congestion control is achieved by performing the adaptive sending rate restoration. The CQAT controller (210) notifies the ECQN via the radio layer to store congestion state variables during the start of blockage. The CQAT controller (210) notifies the ECQN via the radio layer to restore congestion state variables during the end of blockage. The flow control is achieved by advertising the zero-window buffer notification to the end-host. The CQAT controller (110) notifies the ECQN via the radio layer to advertise the zero-window during the start of blockage. The CQAT controller (110) notifies the ECQN includes TCP duplicate acknowledgments via the radio layer for resuming the data transfer which was kept on hold due to blockage.

For RTT recalculation, the CQAT controller (210) estimates the RTT by considering the Radio link events and sets the window and its state variables. There are radio-layer procedures that cause increased End-to-End (E2E) delay and impact the goodput achieved by the transport layer. The reason for such events is the variation in the link quality. Hence, the CQAT controller (210) performs the RTT and RTO calculation which is highly correlated to the link quality for minimizing/reducing the impact of high latency caused by link fluctuations on the RTT and reducing the packet loss/packet retransmission by modifying RTO during fluctuation.

Unlike existing methods and systems, the CQAT controller (110, 210) manages both upload and download scenarios by revising sending and receiving mechanisms, irrespective of the wireless links position in cross-layer transport. The CQAT controller (110, 210) uses unique approaches such as adaptive sending rate restoration, the flow control for packet loss reduction, and the dynamic RTT calculation techniques for improving throughput. The method includes modifying only the end-hosts (e.g., sender and receiver) and works irrespective of a position of the wireless channel, whether the wireless channel is present at the end-hosts. The ECQN marks packets corresponding to Acknowledgment (ACK) segments in a reverse direction to the sender (200), which reduces the delay between detection and actual notification.

The CQAT controller (110, 210) maximizes/improves the sending rate, which results in 34% throughput gain using adaptive sending rate restoration. Further, the CQAT controller (110, 210) reduces the retransmission events by up to 28% using enhanced flow control. The CQAT controller (110, 210) significantly reduces the delay induced by the blockages up to 38% using dynamic RTT re-calculation during channel fluctuations. The cross-layer link quality estimation for detecting the wireless channel condition is proven effective and shows a significant impact on the transport layer with an accuracy of 92%.

Figure 7B:
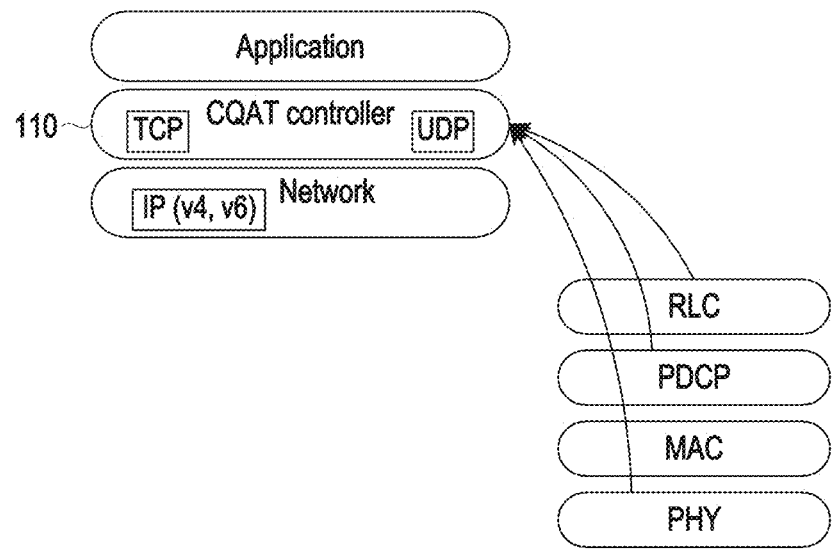
FIG. 7B is a diagram illustrating an example radio protocol stack, according to various embodiments.

FIG. 7B is a diagram illustrating an example radio protocol stack, according to various embodiments. In an embodiment, the CQAT controller (110) performs radio-layer assisted link quality estimation with signal quality parameters and various events and stats of the RLC, the PDCP, the MAC, and the PHY of the radio protocol stack. Further, the CQAT controller (110) monitors other radio-link events such as packet re-ordering and link re-establishment mechanisms. The CQAT controller (110) identifies the start and end of the blockage and channel fluctuations by comparing the SINR change with reference to the adaptive threshold. A window of recent SINR values is maintained and the window average is calculated. Further, the adaptive threshold is calculated using the windowed average. The CQAT controller (110) detects the blockage start if a drop in the SINR is more than a current adaptive threshold and the current adaptive threshold is below 5 dB. The CQAT controller (110) detects the blockage end if the current adaptive threshold is below 5 dB and increase in the SINR is more than the current adaptive threshold. The fluctuation is identified by comparing the current adaptive threshold to the averaged SINR value and adaptive threshold along with another layer information from RLC. The start/end of the blockage is reported to the transport layer.

In an embodiment, the CQAT controller (110) performs the channel quality estimation with RLC re-ordering, in which the CQAT controller (110) monitors the RCL t-reordering timer. The t_reordering timer starts whenever there is a packet loss at the RLC. In another embodiment, the CQAT controller (110) makes decisions about the channel quality fluctuation based on the t_reordering timer expiry along with the SINR changes. When the drop is identified from the SINR due to start of the blockage, then the CQAT controller (110) monitors RLC reordering event. When no reordering event is detected, then the CQAT controller (110) sends the first warning (warn), else the CQAT controller (110) sends the second warning (act). Even after recovering the SINR recovers due to end of the blockage, the reordering can be happening at the RLC. When no reordering event is detected, then the CQAT controller (110) sends the first warning (warn), else the CQAT controller (110) sends the second warning (act). Even after the recovering the SINR recovers, there can be reordering happening at RLC. Hence, the CQAT controller (110) the CQAT controller (110) before sending the recovery message.

The RLC reordering event is monitored using the t_reordering timer, during the beginning and end of the blockage. Even though the signal quality is fluctuating, which does not affect the transport layer unless there are packet losses that lead to events like RLC re-ordering. Also, even after the recovery of the signal quality, lower layers take some time to recover, which can be identified from the t_reordering timer, which brings an additional layer of precision in estimating channel quality.

Figure 8A:
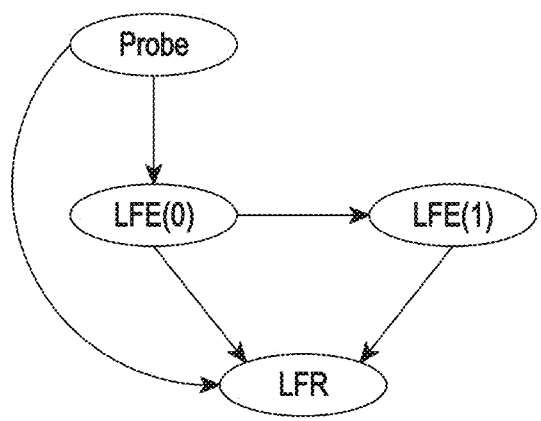
FIG. 8A is a diagram illustrating an example flow of sending ECQN, according to various embodiments.

FIG. 8A is a diagram illustrating an example flow of sending the ECQN, according to various embodiments. The channel quality information should be available to both end-hosts for the congestion control, the flow control, the RTT re-calculation, and bandwidth estimation. The ECQN is used for informing wireless link quality fluctuation to other end-host in a reverse direction. The ECQN is a notification mechanism used to communicate explicit link quality information to the remote host. The ECQN uses transport protocol headers for carrying a message between the end-hosts. The ECQN uses code points given in table 1 to denote the link quality probing, the first warning (e.g., $1^{st}$ level fluctuation warning, the second warning (e.g., $2^{nd}$ level fluctuation warning), and link recovery.

TABLE 1

| State | Wireless end host | Other end host | Reference value |
|---|---|---|---|
| probe | CQ_Probing | | 0 |
| first warning (i.e. LFE(0)) | CQ_Report1 | CQ_Healing1 | 1 |
| second warning (i.e. LFE(1)) | CQ_Report2 | CQ_Healing2 | 2 |
| Recover (i.e. LFR) | CQ_Reset | | 3 |

The CQAT controller (110, 210) uses two implementations for sending the ECQN. In first implementation, using TCP reserved bits in which 2 bits are used for 4-level ECQN states, where only end-host should support for the ECQN is required. In second implementation, Using Explicit Congestion Notification (ECN) bits in which 2 ECN bits are used for exchanging the channel quality information as the congestion experienced, where middle-nodes should support the ECN and end-hosts should support the ECQN.

Figure 8B:
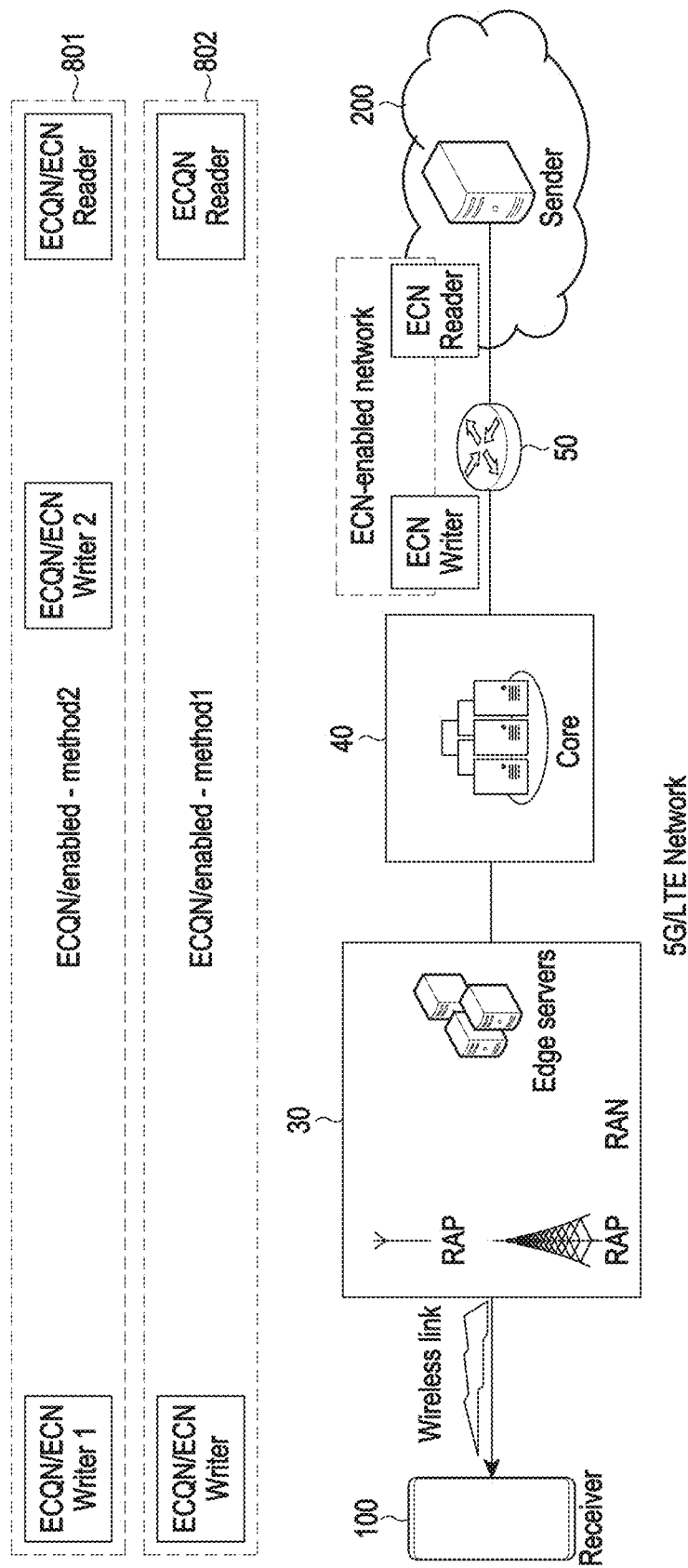
FIG. 8B is a diagram illustrating an example of managing the ECQN, according to various embodiments.

FIG. 8B is a diagram illustrating an overview of an example of managing the ECQN, according to various embodiments. The CQAT controller (110) 15 uses the ECQN for informing wireless link quality fluctuation to the sender (200) in the reverse direction. The ECQN marks packets corresponding to the ACK segments in the reverse direction to the sender (200), which reduces the delay between detection and actual notification. The ECQN can be operated in two modes. In first mode, the ECQN uses TCP reserved bits in TCP header or unused bit in public flag of QUIC, where the ECQN uses a 2-level warning message to inform sender about the channel quality. In second mode, the ECQN uses ECN bits, and uses wireless link quality as an indication of congestion with the goal of reducing packet loss and delay, whereas the second mode can work without modifying sender's TCP/QUIC also. The receiver (100) modifies the flow control according to the ECQN values to avoid wireless losses. The ECQN indicates the sender (200) about channel quality for handling packet losses with faster recovery and also, for controlling sending rate to avoid loss.

The receiver (100) and the sender (200) can use two methods to communicate the ECQN as shown in 801 and 802. In first method shown in 801, the receiver (100) is the ECQN/ECN writer 1, and the sender (200) is the ECQN/ECN reader, where a node (30, 40, 50) that connecting the receiver (100) with the sender (200) is ECQN/ECN writer 2 that should support the ECQN or the ECN. In second method shown in 802, the receiver (100) is the ECQN/ECN writer 1, and the sender (200) is the ECQN reader, where the node (30, 40, 50) connecting the receiver (100) with the sender (200) need not to support the ECQN or the ECN.

Figure 9:
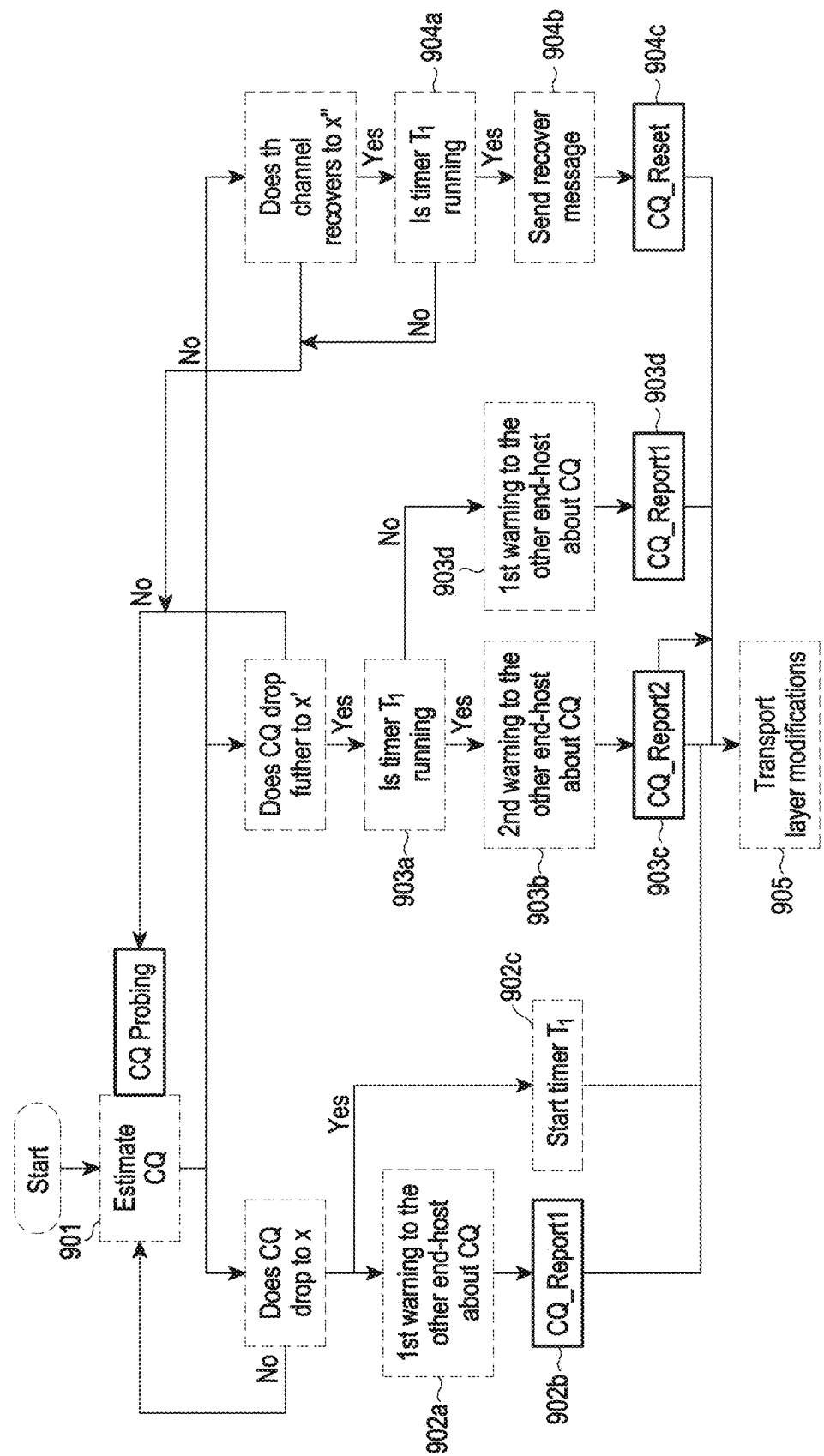
FIG. 9 is a flow diagram illustrating an example method of generation of the ECQN, according to various embodiments.

FIG. 9 is a flow diagram (900) illustrating an example method of generation of the ECQN, according to various embodiments. CQ_Probing, CQ_Report1, CQ_REPORT2, and CQ_Reset are the states of radio channel condition while downloading data. These states will be communicated with the other end host (200) for making transport layer modifications. Timer T1 is defined as the amount of time to wait to recover the channel quality. Time window of the timer T1 is determined based on various network conditions and parameters used for channel quality estimations. If radio link recovered within before expiry of timer T1, then the receiver (100) recovers the receiver (100), else ignore. The end host (100, 200) can use the TCP reserved bits in the ACKs for sending ECQN states. x, x', x" are configurable values to define estimated channel quality, where x">x>x'.

At 901, the receiver (100) estimates the Channel Quality (CQ) by keeping the state CQ probing. At 902a-902c, upon detecting that the CQ drops to x, the receiver (100) changes the state to the first warning, sends the ECQN including the CQ_Report1 to the sender (200), and starts the timer T1. At 903a-903c, upon detecting that the CQ drops to x' and the timer T1 is active, the receiver (100) changes the state to the second warning, sends the ECQN including the CQ_Report2 to the sender (200). At 903d, upon detecting that the CQ drops to x' and the timer T1 is not active, the receiver (100) maintain the state to the first warning, sends the ECQN includes CQ_Report1 to the sender (200). At 904a-904c, upon detecting that the CQ recovers to x" and the timer T1 is active, the receiver (100) changes the state to the recover, and sends the ECQN includes the CQ_Reset to the sender (200). At 905, the receiver (100) modifies the transport layer for sending the ECQN.

Figure 10:
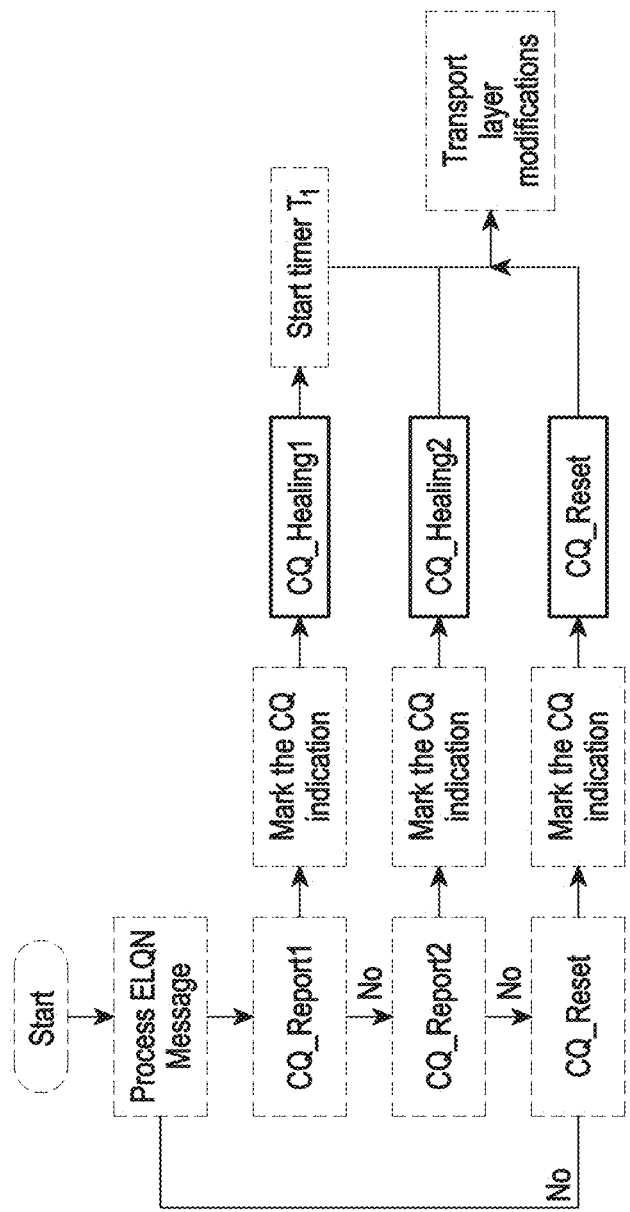
FIG. 10 is a flow diagram illustrating an example method of reception of ECQN states, according to various embodiments.

FIG. 10 is a flow diagram illustrating an example method of reception of ECQN states, according to various embodiments. CQ_Probing, CQ_Healing1, and CQ_Healing2 are the states of the sender (200) upon obtaining the CQ_Report1, the CQ_Report2, the CQ_Reset from the ECQN received from the receiver (100) respectively. The sender (200) activates the timer T1 for an amount of time to wait for the CQ to recover upon receiving the ECQN from the receiver (100). If radio link recovered within T1, then the sender (200) performs the CQ recovery, else ignore. The sender (200) makes Transport layer modifications based on the ECQN messages and states. The time window of the timer T1 is determined based on various network conditions and the parameters used for channel quality estimations.

Figure 11:
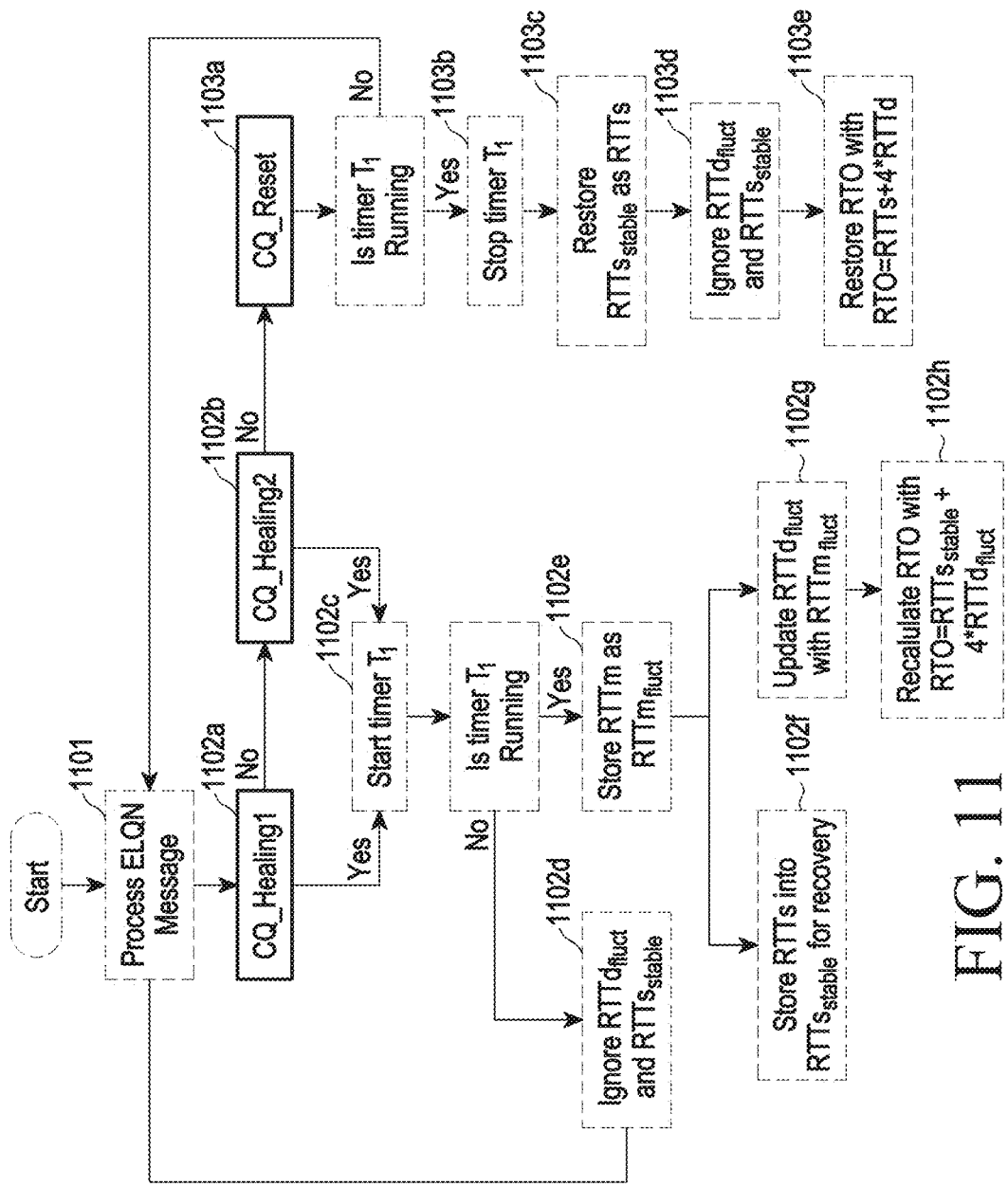
FIG. 11 is a flow diagram illustrating an example method for the RTT estimation by the TCP transmitter, according to various embodiments.

FIG. 11 is a flow diagram illustrating an example method for the RTT estimation by the TCP transmitter, according to an embodiment as disclosed herein. At 1101-1102c, when the ELQN message is received about the CQ during the fluctuation, the sender (200) may detect the CQ_Healing1 or the CQ_Healing2, and starts the timer. At 1102d, the sender (200) ignores a deviated RTT ($RTTd_{fluct}$) during the fluctuation and a stable smoothed RTT ($RTTs_{stable}$), continues to process further ELQN message, upon expiring the timer. At 1102e-1102f, while the timer is running, the sender (200) stores the RTT measured (RTTm) during the fluctuation as $RTTm_{fluct}$, and stores a smoothed RTT (RTTs) into the stable smoothed RTT ($RTTs_{stable}$) for the recovery. To avoid the effect on the RTTs, the sender (200) separates the variable to store the stable RTT using $RTTs_{stable}$ without $RTTm_{fluct}$ values. At 1102g, the sender (200) updates the $RTTd_{fluct}$ with the $RTTm_{fluct}$. At 1102h, the sender (200) recalculates the RTO by adding $RTTs_{stable}$ with 4 times the $RTTd_{fluct}$. During fluctuation, the RTO is recalculated using the RTTd calculated using $RTTm_{fluct}$ to reduce number of retransmissions, in where the sender (200) stores it as $RTTd_{fluct}$.

At 1103ca, when the ELQN message is received about the CQ during the fluctuation, the sender (200) may detect the CQ_Reset. At 1103b-1103c, upon detecting that the timer is running, the sender (200) stops the timer and restores the $RTTs_{stable\ as}$ RTTs. At 1103d-1103e, the sender (200) ignores the $RTTd_{fluct}$ and the $RTTs_{stable}$, and restores the RTO by adding RTTs with 4 times the RTTd. e.g., once the CQ recovery message is received, the current RTTs will be restored with $RTTs_{stable}$ or with latest RTTd and RTTs.

In an embodiment of flow control, when no changes are required in TCP sender (200), then the receiver (100) utilizes the flow control mechanism to limit the TCP sender's sending rate when the channel quality is fluctuating. Two threshold levels $\tau 1$ and $\tau 2$ are used. $\tau 2$ identified by the CQ value below which data transfer is not possible. $\tau 1$ is chosen such that the CQ allows the ACKs to reach the TCP sender (200). When there is a sudden drop in the CQ, the zero-window advertisement (rwnd=0) is made when the CQ<$\tau 1$. This makes the TCP sender (200) go into a persistent mode. If the CQ does not go below $\tau 2$ then the connection is restored. When the channel recovers, the TCP receiver (100) sends 3 duplicate ACKs to restart the flow of data from TCP sender (200). In another embodiment, if the available data rate at the wireless link is estimated and no changes in TCP sender is required, the flow control mechanism can be used to control the TCP sender's sending rate according to the wireless link capacity, which significantly reduces packet loss and buffering resulting in lower latencies. The TCP receiver (100) sets the receive window field in TCP=min {receiver buffer size, estimated BDP}.

The embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of Channel Quality Assisted (CQA) transport by a Transmission Control Protocol (TCP) receiver for a wireless network, comprising:
    monitoring, by the TCP receiver, quality of a wireless channel based on at least one of signal quality parameters and wireless channel events;
    detecting, by the TCP receiver, a fluctuation in the quality of the wireless channel including: (i) determining whether the signal quality parameters meet an adaptive threshold value using a windowed average and (ii) detecting the fluctuation in the quality of the wireless channel in response to determining that the signal quality parameters meet the adaptive threshold value; and
    sending, by the TCP receiver, an indication of the fluctuation in the quality of the wireless channel to a TCP transmitter configured to adjust at least one parameter of a transport layer based on the fluctuation in the quality of the wireless channel,
    wherein the indication comprises information indicating a wireless channel quality state of a plurality of predefined wireless channel quality states associated with the quality of the wireless channel.

2. The method of claim 1, wherein the signal quality parameters comprise at least one of a Signal to Interference and Noise Ratio (SINR), a Channel Quality Indicator (CQI), Received Signal Strength Indicator (RSSI), a Reference Signal Received Power (RSRP), a Reference Signal Received Quality (RSRQ), a Received Signal Code Power (RSCP), and an Energy per Chip to Interference power ratio (EC/IO), and the wireless channel events comprising Radio Link Control/Packet Data Convergence Protocol (RLC/PDCP) statistics, packet re-ordering and link re-establishment, a ratio of packet loss and a frequency of t-reordering timer expiry.

3. The method of claim 1, wherein the indication comprises an Explicit Channel Quality Notification (ECQN) sent over the transport layer, wherein two bits of the ECQN are used for communicating four states comprising probing, first warning, second warning, and recovery of the channel quality between the TCP receiver and the TCP transmitter, and two bits of the ECQN are used for exchanging channel quality information among middle nodes of the TCP receiver and the TCP transmitter.

4. The method of claim 1, wherein detecting the fluctuation in the quality of the wireless channel in response to determining that the signal quality parameters meet the adaptive threshold value, comprises:
    detecting a packet loss at a Radio Link Control (RLC) in response to determining that the signal quality parameters meet the adaptive threshold value;
    initiating a t_reordering timer;
    monitoring for RLC reordering before expiry of the t_reordering timer; and
    detecting the fluctuation in the quality of the wireless channel in response to not detecting the RLC reordering before the expiry of the t_reordering timer.

5. The method of claim 1, wherein sending the indication of the fluctuation in the quality of the wireless channel to the TCP transmitter, comprises:
    estimating an Available Data Rate (ADR) of the wireless channel based on one of a Transport Block (TB) size, and previous ADRs of the wireless channel; and
    sending the indication comprising at least one of the ADR and the quality of the wireless channel to the TCP transmitter.

6. The method of claim 5, wherein estimating the ADR of the wireless channel based on the TB size, comprises:
    determining the TB size based on at least one of a CQI, a Downlink Control Information (DCI), and a network load; and
    estimating the ADR based on at least one of the TB size and the network load.

7. The method of claim 5, wherein estimating the ADR of the wireless channel based on the previous ADRs of the wireless channel, comprises:
    determining the previous ADRs of the wireless channel; and
    predicting the ADR by applying the previous ADRs of the wireless channel to a linear predictive model.

8. The method of claim 1, wherein sending the indication of the fluctuation in the quality of the wireless channel to the TCP transmitter for adjusting the at least one parameter of the transport layer based on the fluctuation in the quality of the wireless channel comprises:

determining whether an ADR of the wireless channel is estimated at the TCP receiver;
determining a data sending rate of the TCP transmitter based on the ADR in response to determining that the ADR of the wireless channel is estimated at the TCP receiver, and sending the indication comprising the data sending rate to the TCP transmitter;
determining whether the quality of the wireless channel meets an upper channel quality threshold and a lower channel quality threshold in response to determining that the ADR of the wireless channel is not estimated at the TCP receiver;
sending the indication comprising a zero-window advertisement to the TCP transmitter, in response to determining the quality of the wireless channel meets the upper channel quality threshold or the lower channel quality threshold; and
sending three duplicate acknowledgments to the TCP transmitter for resuming connection with the TCP receiver, in response to determining the quality of the wireless channel meets the upper channel quality threshold and does not meet the lower channel quality threshold, wherein the TCP receiver is allowed to send acknowledgments to the TCP transmitter.

9. The method of claim 1, wherein the at least one parameter of the transport layer comprises a data flow control, a congestion control, and a Roundtrip Time (RTT) estimation.

10. A method of Channel Quality Assisted (CQA) transport by a Transmission Control Protocol (TCP) transmitter in a wireless network, comprising:
receiving, by the TCP transmitter, an indication of a fluctuation in quality of a wireless channel from a TCP receiver, wherein the indication comprises information indicating: (i) whether the signal quality parameters meet an adaptive threshold value using a windowed average, (ii) the fluctuation in the quality of the wireless channel in response to the signal quality parameters meeting the adaptive threshold value, and (iii) a wireless channel quality state of a plurality of predefined wireless channel quality states associated with the quality of the wireless channel; and
performing, by the TCP transmitter, at least one of congestion control and a Roundtrip Time (RTT) estimation at the transport layer based on the fluctuation in the quality of the wireless channel.

11. The method of claim 10, wherein the indication is an Explicit Channel Quality Notification (ECQN) receive over the transport layer, wherein two bits of the ECQN are used for communicating four states comprising probing, first warning, second warning, and recovery of the channel quality between the TCP receiver and the TCP transmitter, and two bits of the ECQN are used for exchanging channel quality information among middle nodes of the TCP receiver and the TCP transmitter.

12. The method of claim 10, wherein the indication comprises at least one of an Available Data Rate (ADR) and quality of the wireless channel.

13. The method of claim 10, wherein performing the congestion control, comprises: storing a current state of a congestion control mechanism (CCM) upon receiving the indication comprising a first warning state or a second warning state;
starting a timer to track a duration of the fluctuation;
receiving an indication comprising a recovery state from the TCP receiver; and
restoring a sending rate of the TCP transmitter to a pre-stored value or a current estimated ADR before starting next fluctuation, wherein based on the wireless channel not being recovered before expiry of the timer, the stored values are ignored and, the TCP transmitter estimates an ADR.

14. The method of claim 10, wherein performing the RTT estimation, comprises:
storing a RTT measured during no fluctuation as a stable RTT;
storing a RTT measured during fluctuation as a first fluctuating RTT, upon receiving the indication comprising a first warning state or a second warning state;
receiving an indication comprising a recovery state from the TCP receiver; and
modifying a current RTT as the stable RTT.

15. The method of claim 14, wherein the method further comprises:
determining a TCP-Retransmission Timeout (TCP-RTO) using a deviated RTT and the first fluctuating RTT to reduce retransmissions during the fluctuation;
storing the TCP-RTO as a second fluctuating RTT;
receiving an indication comprising the recovery state from the TCP receiver; and
determining a normal TCP-RTO using a latest deviated RTT and a latest smoothed RTT.

16. A Transmission Control Protocol (TCP) receiver for Channel Quality Assisted (CQA) transport in a wireless network, comprising:
memory storing instructions; and
at least one processor coupled to the memory, wherein the instructions, when executed by the at least one processor individually or collectively, cause the TCP receiver to:
monitor quality of a wireless channel based on at least one of signal quality parameters and wireless channel events,
detect a fluctuation in the quality of the wireless channel including: (i) determine whether the signal quality parameters meet an adaptive threshold value using a windowed average and (ii) detect the fluctuation in the quality of the wireless channel in response to determining that the signal quality parameters meet the adaptive threshold value, and
send an indication of the fluctuation in the quality of the wireless channel to a TCP transmitter for adjusting at least one parameter of a transport layer based on the fluctuation in the quality of the wireless channel,
wherein the indication comprises information indicating a wireless channel quality state of a plurality of predefined wireless channel quality states associated with the quality of the wireless channel.

17. A Transmission Control Protocol (TCP) transmitter for Channel Quality Assisted (CQA) transport in a wireless network, comprising:
memory storing instructions; and
at least one processor coupled to the memory, wherein the instructions, when executed by the at least one processor individually or collectively, cause the TCP transmitter to:
receive an indication of a fluctuation in quality of a wireless channel from a TCP receiver, wherein the indication comprises information indicating: (i) whether the signal quality parameters meet an adaptive threshold value using a windowed average, (ii) the fluctuation in the quality of the wireless channel in response to the signal quality parameters meeting the adaptive threshold value, and (iii) a wireless channel quality state of a plurality of predefined wireless channel quality states associated with the quality of the wireless channel, and perform at least one of congestion control and a Roundtrip Time (RTT) estimation at the transport layer based on the fluctuation in the quality of the wireless channel.

* * * * *